United States Patent
Suzuki et al.

[11] Patent Number: 6,067,070
[45] Date of Patent: May 23, 2000

[54] DISPLAY CONTROL APPARATUS HAVING A DISPLAY OF TEXT DATA AND IMAGE DATA AND DISPLAY CONTROL METHOD FOR THE SAME

[75] Inventors: Kiyoshi Suzuki; Takio Yoshida, both of Yamatokoriyama, Japan

[73] Assignee: Sharp Kabushiki Kaisha, Osaka, Japan

[21] Appl. No.: 08/791,465

[22] Filed: Jan. 27, 1997

[30] Foreign Application Priority Data

Mar. 7, 1996 [JP] Japan ..................................... 8-050351

[51] Int. Cl.$^7$ ............................... G09G 5/00; G09G 5/26
[52] U.S. Cl. .......................... 345/127; 345/129; 345/439; 382/298
[58] Field of Search ..................................... 345/173, 146, 345/127–131, 439; 395/710; 360/990; 382/176, 282, 298

[56] References Cited

U.S. PATENT DOCUMENTS

| | | | |
|---|---|---|---|
| 4,893,258 | 1/1990 | Sakuragi | 345/439 |
| 5,680,479 | 10/1997 | Wang et al. | 382/176 |

FOREIGN PATENT DOCUMENTS 4-270384  9/1992  Japan .

OTHER PUBLICATIONS

Alan Simpson, Mastering Wordperfect 5.1 & 5.2 For Windows, SYBEX Inc., pp. 132–146, and pp. 641–650, 1993.

*Primary Examiner*—Dennis-Doon Chow
*Assistant Examiner*—Amr Awad
*Attorney, Agent, or Firm*—Nixon & Vanderhye P.C.

[57] ABSTRACT

When text data and image data are displayed in a scale-down display area in a one-sight display, the text data is scaled down with a first scale-down percentage according to which characters are recognizable, and the image data is scaled down with a second scale-down percentage according to which the image can be all accommodated horizontally and the configuration as a whole can be easily recognized. Moreover, when the text data is displayed in the scale-down display area, a character series included in the text data is adjusted into a character series layout in which a line end is set to correspond to a number of characters per line in the scale-down display area, so that no line in the scale-down display area has an undisplayed character that is not accommodated in that line. The character arrangement of the text data is set according to the character series layout. Consequently, a display control apparatus of excellent visual recognition and operability that allows content of both the text data and the image data to be easily confirmed in the one-sight display (mixed one-sight display) where the text data and the image data are displayed in the same screen at the same time.

25 Claims, 7 Drawing Sheets

201a

| ONE-SIGHT | | NEW | CORRECT |

MONDAY, MARCH 18, 1996

DISPLAY CONTROL APPARATUS HAVING A DISPLAY OF TEXT DATA AND IMAGE DATA AND DISPLAY CONTROL METHOD FOR THE SAME

FIELD OF THE INVENTION

The present invention relates to a display control apparatus, incorporated in, for example, an information processing apparatus having a display section, for scaling down and displaying both text data and image data on the display screen at the same time, and also relates to a display control method used for such a display control apparatus.

BACKGROUND OF THE INVENTION

Nowadays information processing apparatuses, such as electronic notebooks, for storing and displaying data are widely used. A display control apparatus for controlling a display section of such an information processing apparatus needs to scale displayed data, so as to enable the user to, for example, recognize the configuration as a whole and look at data displayed in a certain portion in a more detailed manner.

There are two kinds of data: text data (see FIG. 4) containing information on characters and numerals, and image data, or information on images (see FIG. 5). A display control apparatus can display both text data and image data on a display screen of a display section at the same time. A display of such a manner is called a mixed one-sight display, and here is how the mixed one-sight display is realized. The display screen is divided into a plurality of blocks (scale-down display areas), and the text data and the image data are scaled down so as to be accommodated in respective blocks. However, a conventional display control apparatus applies the same scale-down percentage to both the text data and the image data in carrying out the mixed one-sight display.

In the mixed one-sight display, the user often needs the text data to be displayed for confirmation of the content thereof and the image data to be displayed for confirmation of the configuration as a whole.

When a low scale-down percentage (for example, 66%) is used in the conventional mixed one-sight display with priority given to a display of the text data rather than to that of the image data, it is easy to recognize the content of the text data, which is scaled down only by a low percentage. However, in some cases, such a mixed one-sight display cannot accommodate the content of the image data in a scale-down display area and the user cannot recognize the whole image. Also, as to the text data, since only a small number of characters can be accommodated in one line, not all the characters are always displayed in a single line. A sentence, if cut off halfway, often cannot be well understood. Therefore, in a case when not all the characters are displayed in a single line, and therefore the content of the sentence cannot be well understood, the user must scroll the scale-down display area in "a row direction" every time he/she reads a line, which often poses a great inconvenience to the user.

Note that "a row direction" here refers to a horizontal direction when the text data is written horizontally, and refers to a vertical direction when the text data is written vertically, for example, as when the display is in the Japanese language. Note also that "a column direction" is perpendicular to a row direction, or in other words, refers to a vertical direction when the text data is written horizontally, and refers to a horizontal direction when the text data is written vertically.

By contrast, when a high scale-down percentage (for example, 50%) is used with priority given to a display of the image data rather than to that of the text data, it is easy to recognize the whole image of the image data. However, in some cases, the content of the text data is hard to recognize due to a low resolution. Therefore, for example, the scale-down percentage must be reduced to confirm the content of the text data, which often poses inconvenience to the user.

SUMMARY OF THE INVENTION

An object of the present invention is to offer a display control apparatus of excellent visual recognition and operability that allows both text data and image data to be easily confirmed in a one-sight display (mixed one-sight display) where the text data and the image data are displayed in the same screen at the same time.

In order to accomplish the above object, the display control apparatus in accordance with the present invention controls a display section so that the display section can carry out a mixed one-sight display of text data and image data by dividing a screen of the display section into a plurality of scale-down display areas, scaling down the text data and the image data, and then displaying either the scaled-down text data or the scaled-down image data in each of the areas, and is characterized in that the display control apparatus includes a text data display control section for displaying the text data in the scale-down display area; an image data display control section for displaying the image data in the scale-down display area; and a scale-down percentage control section for setting a scale-down percentage of the text data displayed in the scale-down display area by the text data display control section to a first scale-down percentage, and setting a scale-down percentage of the image data displayed in the scale-down display area by the image data display control section to a second scale-down percentage that is different from the first scale-down percentage.

The above display control apparatus, when displaying the text data in a scaled-down manner, can display the text data with an optimum scale-down percentage according to which the greatest possible number of characters can be displayed clearly enough to be recognized. By contrast, the above display control apparatus, when displaying the image data in a scaled-down manner, can display the image data with an optimum scale-down percentage (e.g., a higher percentage than that of the text data) according to which the configuration as a whole can be recognized even after being scaled-down. This enables the text data and the image data to be displayed in a mixed one-sight display in a manner that visual recognition is improved for both the text data and the image data.

According to one of preferred embodiments in accordance with the present invention, the text data display control section includes a character arrangement control section for adjusting a character series included in the text data to a character series layout in which a line end is set so as to correspond to a number of characters allowed to be displayed per line in the scale-down display area.

The above display control apparatus adjusts the character series included in the text data to the character series layout in which the line end is set so as to correspond to the number of characters allowed to be displayed per line in the scale-down display area, so that no line in the scale-down display area has an undisplayed character that is not accommodated in that line, and also controls the character arrangement of the text data according to the character series layout. This enables the text data displayed in the scaled-down manner in the scale-down display area to constitute a continuous character series as a sentence, and also enables the user to confirm the content of the character information without scrolling in a row direction.

According to one of more preferred embodiments in accordance with the present invention, the display control apparatus further includes a scroll direction display section for, when there is undisplayed data not being able to be displayed in the scale-down display area, displaying on the display section a scroll direction of the displayed information for each of the scale-down display areas having the undisplayed data; and a scroll control section that enables a signal to be inputted from a scroll direction input section realizing a scroll instruction operation in accordance with a display state of the scroll direction, wherein the scroll control section carries out a scroll control of one of the scale-down display areas that is to be operated according to the input of the signal from the scroll direction input section separately from the other scale-down display areas.

The above display control apparatus, when there is undisplayed data not being able to be displayed in at least one of the scale-down display areas, displays for each of such scale-down display areas a direction in which the displayed information can be scrolled. Therefore, it is possible to easily recognize in which direction and in which scale-down display area the undisplayed data can be found. In this case, by operating the scroll direction input section, the user can carry out the scroll instruction operation that is in accordance with a display state of the direction in which the displayed information can be scrolled. As the user selects one of the scale-down display areas that can be scrolled, only the displayed information in the selected scale-down display area can be scrolled separately from the other scale-down display areas. This makes it possible to confirm the undisplayed data in the one-sight display screen without switching from the one-sight display to a non-scale display.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) is an explanatory drawing showing a one-sight display (mixed one-sight display) by the display control apparatus, where plural sets of schedule data including both text data and image data are displayed in a mixed manner in a data area.

FIG. 6(b) is an explanatory drawing showing an example where a scale-down display area for displaying text data on the display screen as shown in FIG. 6(a) has been scrolled downward.

FIG. 6(c) is an explanatory drawing showing an example where a scale-down display area for displaying image data on the display screen as shown in FIG. 6(a) has been scrolled downward.

DESCRIPTION OF THE EMBODIMENT

The following description will discuss an embodiment in accordance with the present invention .

Figure 2:
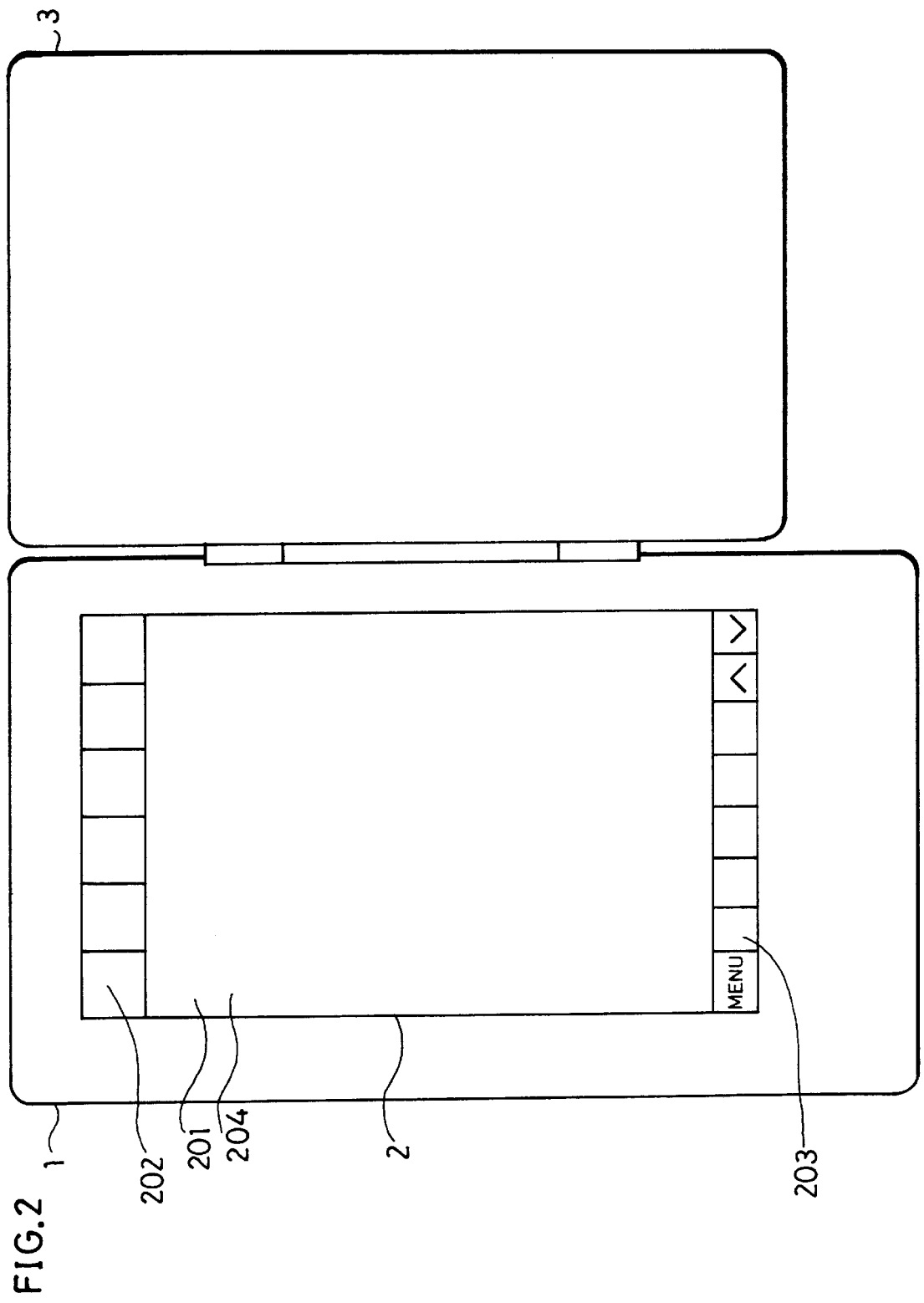
FIG. 2 is a plane view showing an external appearance of an information processing apparatus incorporating the display control apparatus.

As shown in FIG. 2, a main body 1 of an information processing apparatus (hereinafter, will be simply referred to as the main body 1) of the present embodiment has an almost rectangular box shape of a low height and incorporates a display control apparatus of the present embodiment.

An input and output section 2 for inputting and outputting data is provided on one side of the main body 1. A plate-shaped lid section 3 is connected to an end of that side of the main body 1 by a hinge so as to be rotatable. The lid section 3 can rotate approximately 180 degrees around the hinge-connected portion from the position covering the input and output section 2. Therefore, when the main body 1 is not used, the lid section 3 protects the input and output section 2: when the main body 1 is used, the lid section 3 is moved to a position where the lid section 3 does not disturb the user operating the input and output section 2.

The input and output section 2 has a liquid crystal display section (display section) 201 for displaying data, a function select key 202 and an operation select key 203. A transparent tablet 204 is provided to cover the liquid crystal display section 201, the function select key 202 and the operation select key 203. The transparent tablet 304 can detect an operation with a pen by the user. The liquid crystal display section 201 is a matrix type liquid crystal panel, a thin display device capable of displaying characters and images. A backlight may be added on the back of the liquid crystal display section 201 if necessary.

Figure 4:
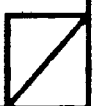
FIG. 4 is an explanatory drawing showing an example of displaying text data in a data area with the display control apparatus without scaling.
Figure 5:
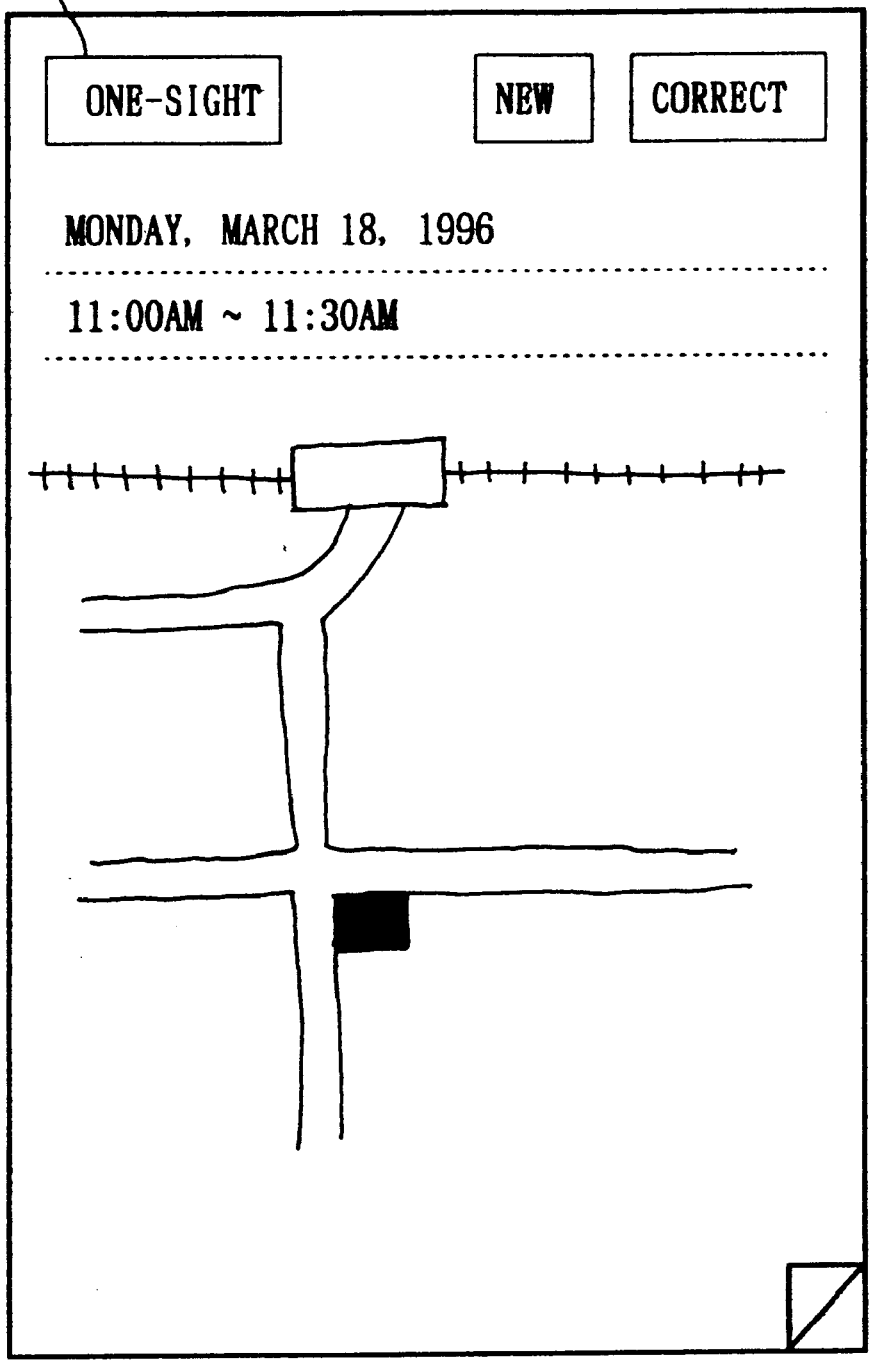
FIG. 5 is an explanatory drawing showing an example of displaying image data in a data area with the display control apparatus without scaling.
Figure 6:
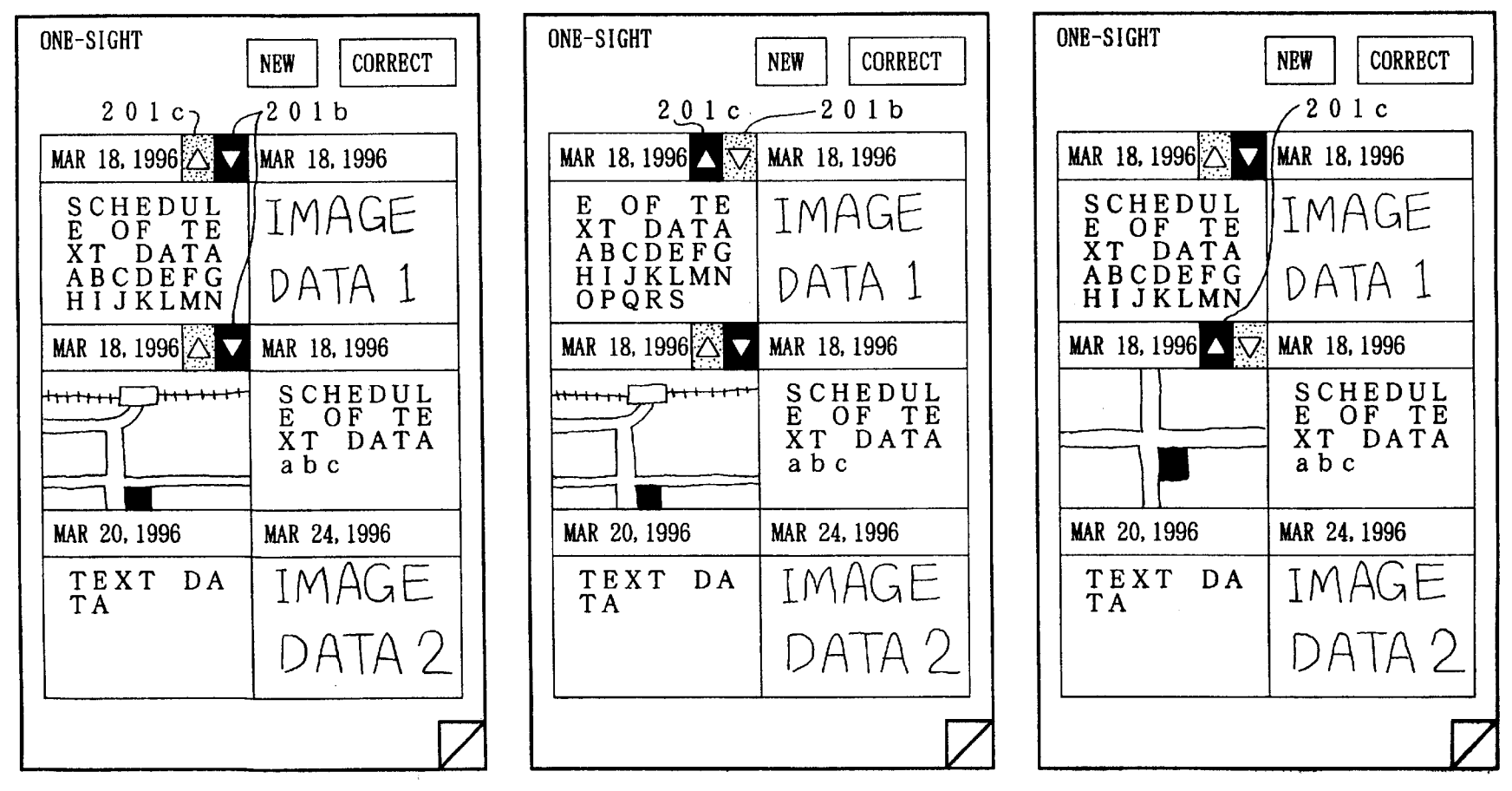

The liquid crystal display section 201, as shown in FIGS. 4 and 5, c an display stored sets of data independently in a data area, that is an area for displaying data. In the following discussion, it is assumed that the data is displayed without being scaled. In addition, as shown in FIGS. 6(a) through (c), the liquid crystal display section 201 can also carry out a one-sight display (mixed one-sight display) of plural sets of data (text data and/or image data) by dividing the data area into a plurality of areas (scale-down display areas). The non-scale display can be easily switched to the one-sight display by touching with the pen a portion of the transparent tablet 204 covering a one-sight display button 201a that is displayed on the liquid crystal display section 201 as shown in FIGS. 4 and 5.

The function select key 202 is a key group for selecting various functions (calendar, schedule, address note, memo, calculation, clock, dictionary, etc.) of the main body 1. The operation select key 203 is a key group for selecting common operations, such as a menu display and a cursor control, used for carrying out a function selected with the function select key 202.

Figure 3:
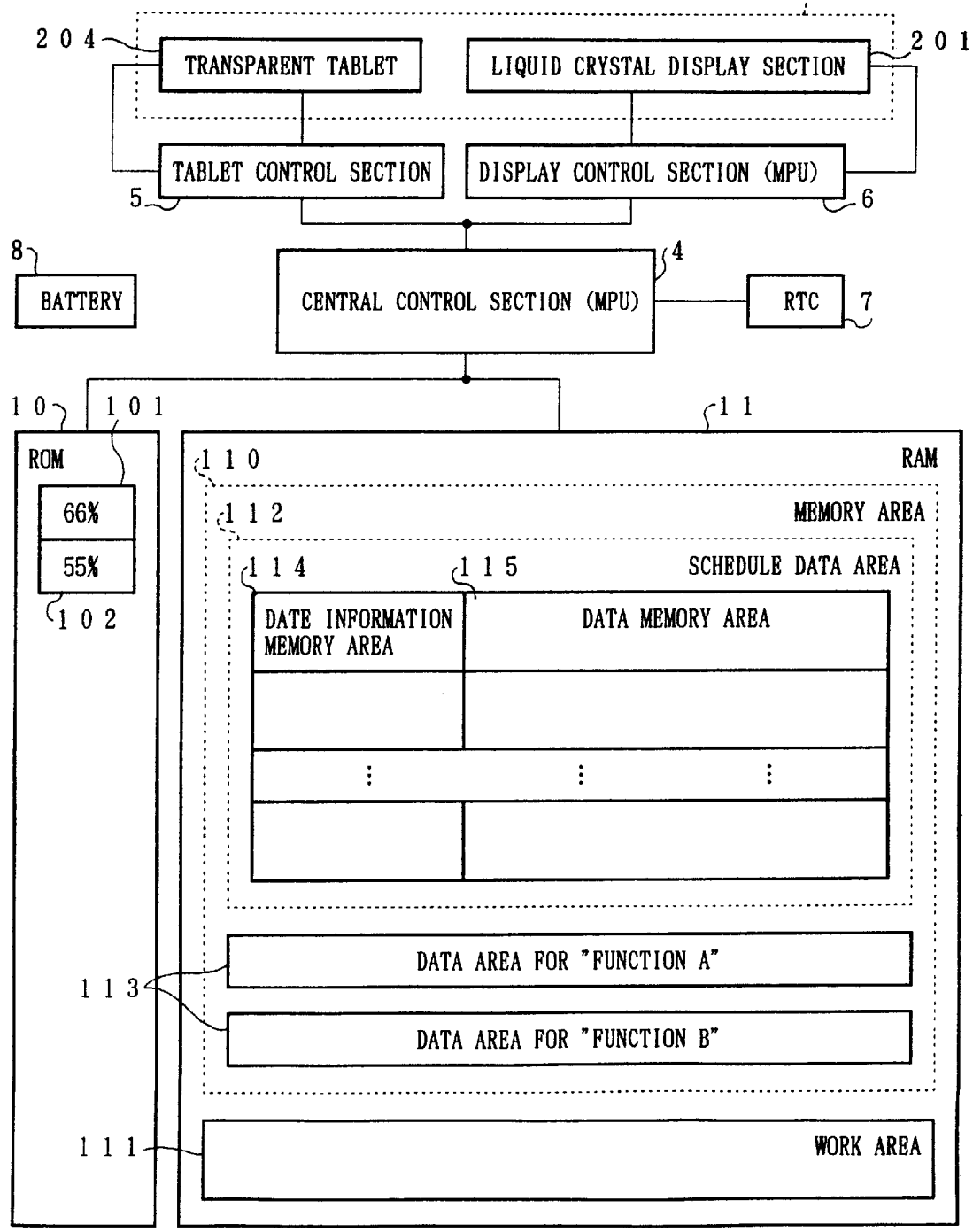
FIG. 3 is a block diagram showing a configuration of a main part of the information processing apparatus incorporating the display control apparatus.

The transparent tablet 204 is made of a transparent material, through which a display on the liquid crystal display section 201 can be seen. In addition, when operated by the user with the pen, the transparent tablet 204 can detect with, for example, pressure whether an input has been made or not, and, if so, can detect the coordinate of the place where the input is made with the pen. The detection may be carried out with any conventional method: for example, an optical method using an infrared ray, a magnetic method and a method using electrostatic capacity. Various functions and operations are selected in accordance with the detection, and text data and image data are inputted. The device for detecting the coordinate on the display screen is not necessarily a combination of a transparent tablet and a pen. Alternatively, a pointing device such as a mouse or a track ball may be used. As shown in FIG. 3, the main body 1 is provided inside thereof with a central control section 4, a tablet control section 5, a display control section 6, a real time clock (RTC) 7 for outputting the present time in accordance with a clock (not shown), a battery 8 for supplying electricity to the whole main body 1, a read-only memory (ROM) 10 and a random access memory (RAM) 11.

The central control section 4 controls the whole main body 1 and processes operations such as an input and an output in response to various instructions. The tablet control section 5 controls the transparent tablet 204 and detects whether the pen is in touch with the transparent tablet 204. In addition, when the pen is in touch with the transparent tablet 204, the tablet control section 5 also detects the coordinate of the place where the pen touches the transparent tablet 204. The display control section 6 carries out a display on the liquid crystal display section 201 in accordance with a control signal from the central control section 4.

In the present embodiment, undisplayed data detecting means described in the claims corresponds to the central control section 4. Text data display control means, image data display control means, character arrangement control means, undisplayed data informing means, scroll direction display means and scroll control means are constituted of the central control section 4 and the display control section 6. Scroll direction input means is constituted of the transparent tablet 204 and the tablet control section 5. The central control section 4 and the display control section 6 are composed of a microprocessor (MPU).

The battery 8 supplies electricity necessary for the operation of the main body 1 through a power supply circuit (not shown) to various components.

The ROM 10 has a first scale-down percentage memory area 101 as first scale-down percentage memory means for recording a scale-down percentage of text data (a first scale-down percentage), and a second scale-down percentage memory area 102 as second scale-down percentage memory means for recording a scale-down percentage of image data (a second scale-down percentage). In a preferred example, the first scale-down percentage is set to 66% and the second scale-down percentage is set to 50%. Besides, the ROM 10 has areas (not shown here) for storing a program for operating the central control section 4, screen data constituting various screen displays, and a font for displaying text data, so as to realize various functions of the main body 1.

Note that when the first and second scale-down percentages are set in the above manner, the second scale-down percentage (50%) is described as 'higher' than the first scale-down percentage (66%).

In the present embodiment, scale-down percentage control means described in the claims is constituted of the first scale-down percentage memory area 101, the second scale-down percentage memory area 102, the central control section 4 and the display control section 6.

The RAM 11 has a memory area 110 for storing data inputted to the main body 1 and a work area 111 for temporarily storing data during, for example, a calculation process. The memory area 110 has a schedule data area 112 for storing data of a schedule function discussed in the present embodiment, and function-by-function data areas 113 for storing data dealt with by the other function(s) of the main body 1. In addition, the schedule data area 112 is composed of a date information storing area 114 for storing the date of inputted schedule data, and a data memory area 115 for storing the inputted schedule data (text data and/or image data).

In the above configuration, the user, after activating the main body 1, can select the schedule function by touching with the pen a portion of the transparent tablet 204 covering the key for the schedule function in the function select key 202. Various works can be done about schedule with the schedule function: for example, inputting schedule data and confirming the inputted schedule data. The user can select, by touching the transparent tablet 204 with the pen, the schedule data to be inputted either as text data or as image data. The schedule data is stored in the data memory area 115 in either of the data format.

When the schedule data is inputted together with date information thereof, the date information is stored in date information memory area 114. Various methods are possible to input the data: for example, the user selects a character from a key board displayed on the liquid crystal display section 201, or the user writes a character on the transparent tablet 204 which is then recognized by the apparatus.

The following description will explain a display example of the liquid crystal display section 201 when the schedule function is selected. FIGS. 4 and 5 shows respectively inputted text data and image data displayed in a data area of the liquid crystal display section 201 without scaling. The information displayed here is inputted by the user through the transparent tablet 204 in advance. As described above, the information on a date is stored in the date information memory area 114 shown in FIG. 3, while the schedule data belonging to that date is stored in the data memory area 115. In this display screen, the text data is displayed in a 12 dot font.

FIGS. 6(a) through 6(c) show an example where the schedule data inputted in the text data format and the schedule data inputted in the image data format are displayed in the one-sight display (mixed one-sight display). Each scale-down display area has on the upper end thereof a bar area in which the date and two buttons are displayed.

A bar button 201b, one of the two buttons above, is a downward bar button indicating that the schedule data is only partly displayed in the scale-down display area (a part of the schedule data is hidden) and that the hidden part can be found downward. A button bar 201c, the other button of the two, is an upward bar button indicating that the schedule data is only partly displayed in the scale-down display area (a part of the schedule data is hidden) and that the hidden part can be found upward.

As respective portions of the transparent tablet 204 covering the bar buttons 201b and 201c are touched with the pen when the button is in an ON state, the scale-down display area is scrolled in the direction indicated by the arrow (downward for the bar button 201b and upward for the bar button 201c).

In FIG. 6(a), the scale-down display area in which text data is displayed (upper left) has the bar button 201b in an ON state and the bar button 201c in an OFF state, which shows that a part of the text data is hidden downward. FIG. 6(b) shows how the hidden text data in FIG. 6(a) is displayed when the portion of the transparent tablet 204 covering the bar button 201b is touched with the pen. The same scale-down display area in FIG. 6(b) has the bar button 201b in an OFF state and the bar button 201c in an ON state, which is the other way round from FIG. 6(a). FIG. 6(c) shows how the hidden image data in the scale-down display area (center left) in FIG. 6(a) is displayed when the portion of the transparent tablet 204 covering the bar button 201b is touched with the pen.

Figure 1:
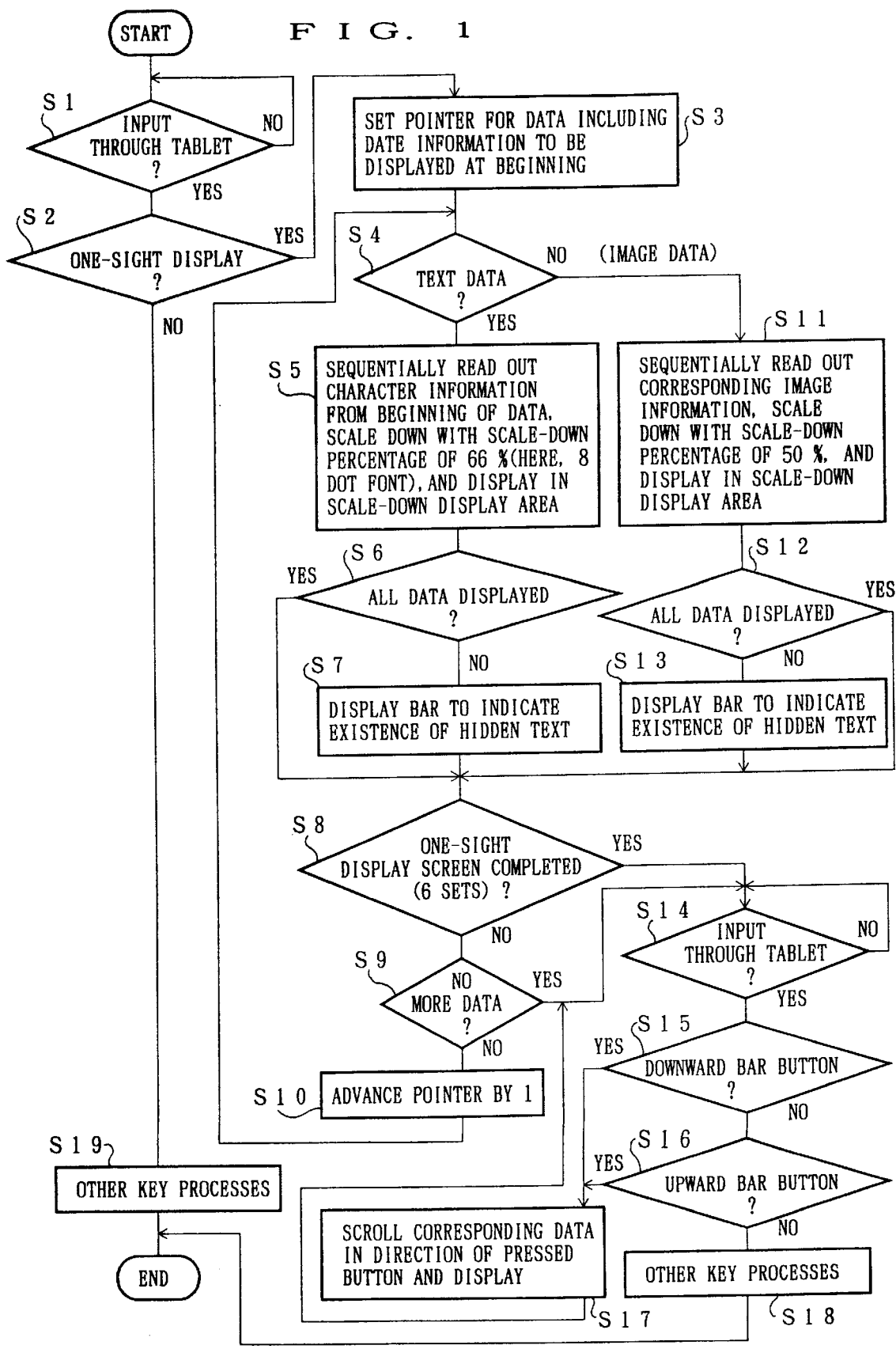
FIG. 1, illustrating an embodiment in accordance with the present invention, is a flow chart showing an operation of a display control apparatus carrying out a one-sight display.
Figure 7:
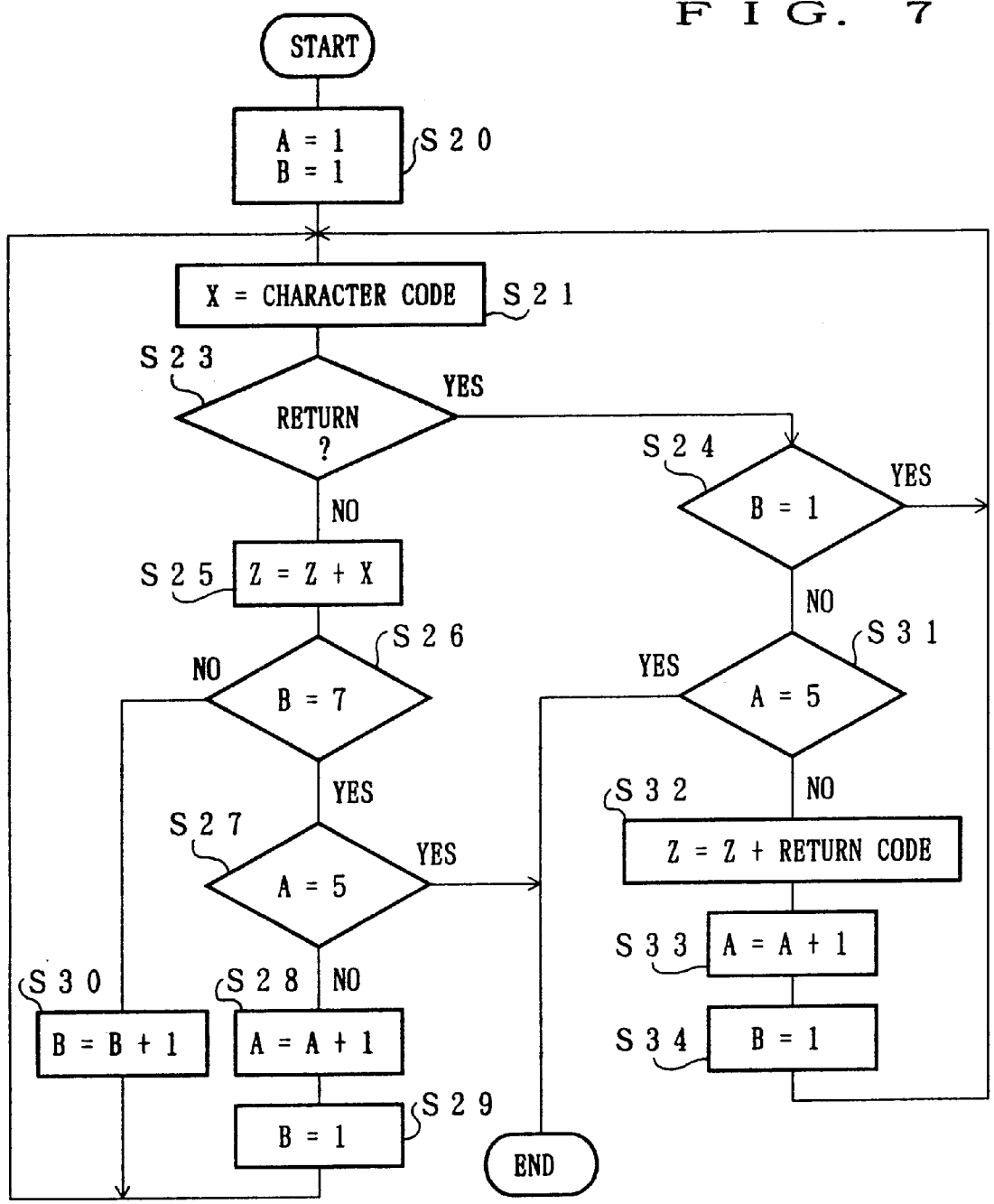
FIG. 7 is a flow chart showing a process of displaying text data in a scale-down display area with the display control apparatus.

Referring to the flow charts in FIGS. 1 and 7, the following description will explain a control of a one-sight mixed display of text data and image data carried out by the display control apparatus in accordance with the present invention.

Note that FIG. 1 is a flow chart showing a series of operations which starts where a non-scale display is being carried out as a result of selecting the schedule function with the function select key 202 shown in FIG. 2 after storing the schedule data in the schedule data area 112 shown in FIG. 3.

First, it is judged in the schedule function whether or not there has been an input made through the transparent tablet 204 (S1). If no input has been made through the transparent tablet 204 (if NO in S1), S1 is repeatedly carried out until an input is detected.

On the other hand, if an input through the transparent tablet 204 is detected (if YES in S1), it is judged whether the input is made at the button 201a for carrying out a one-sight display (S2). If the input through the transparent tablet 204 is not made at the one-sight display button 201a (if NO in S2), a different process is carried out in accordance with the selection (S19).

On the other hand, if the input through the transparent tablet 204 is made to the one-sight display button 201a (if YES in S2), the pointer of the schedule data displayed in the scale-down display area in the upper left corner of the one-sight display screen (the first scale-down display area) is set to start a one-sight display (S3). Here, a "pointer" refers to a data factor indicating the position of data which is displayed in a one-sight display. Although various kinds of pointers are possible, the present embodiment employs the date information as the pointer. For example, if the button 201a is pressed when the schedule data dated March 18 is displayed without being scaled as shown in FIG. 4, the date information that has the earliest time of all the schedule data belonging to March 18 is the pointer of the schedule data selected for the upper left corner of the one-sight display screen. Thereafter, a predetermined number of sets of the schedule data (e.g., six sets in the present embodiment) are displayed in the one-sight display in the order of the pointers, i.e., in the order of the time.

Next, the schedule data is read out of the data memory area 115 in accordance with the pointer, and it is judged whether or not that schedule data is text data (S4). If the data is text data (if YES in S4), S5 is executed. If the data is image data (if NO in S4), S11 is executed.

In S5, the first scale-down percentage stored in the first scale-down percentage memory area 101 of the ROM 10 is read out to display the text data. The first scale-down percentage is set in advance so that the characters can be displayed in the greatest possible number clearly enough to be recognized when the text data is displayed in a scaled-down manner. In the present embodiment, the scale-down percentage is 66%, and the text data before being scaled down is displayed in a 12 dot font. Therefore, the text data is displayed in an 8 dot font in a one-sight display.

Next, the text data indicated by the pointer is adjusted to a character series layout in which the line end is set to correspond to the number of characters per line in the scale-down display area, so that no line in the scale-down display area has an undisplayed character that is not accommodated in that line. Then, the text data is outputted with the first scale-down display percentage in the scale-down display area in accordance with the character series layout. That is, the scale-down display area is divided into blocks consisting of n pieces of rows and m pieces of columns, and the character series in the text data are arranged so that each block displays the characters consecutively starting from the first character position.

Here, referring to the flow chart shown in FIG. 7, the display output of the text data to the scale-down display area in S5 will be discussed in detail.

The present embodiment will discuss an example of a one-sight display where five lines can be displayed in one scale-down display area on the screen and seven characters can be displayed in one line.

First, 1 is substituted to a variable A showing information on the number of lines and to a variable B showing the number of characters per line to initialize the variables A and B (S20).

Next, in S21, a character code for one character is read in as a character variable X out of the text data stored in the data memory area 115 as character codes. Here, as a result, if the process in S21 is the N-th process with respect to the text data, the N-th character code is read in as a character variable X.

Thereafter, it is judged whether or not the character code read into the character variable X is a code for a return (S23). If it is judged that the character code is not a return code (if NO in S23), the character code of the character variable X read in in S21 is additionally stored in a sentence variable Z storing a sentence that has been edited (S25).

Next, it is judged with the variable B whether or not another character can be additionally displayed in the same line (S26). That is, if the variable B has not reached 7 (if NO in S26), it is possible to display another character in the same line. In this case, after 1 is added to the variable B so as to increase the number of characters accommodated in the line (S30), the next character code is read in as a character variable X (S21).

On the other hand, if the variable B has reached 7 (if YES in S26), it is impossible to display another character in the same line. In this case, it is judged with the variable A whether or not another line can be additionally displayed in the scale-down display area (S27). That is, if the variable A has reached 5 (if YES in S27), the process is finished, since it is impossible to display an another line in the scale-down display area.

On the other hand, if the variable A has not reached 5 (if NO in S27), it is possible to display another line. In this case, 1 is added to the variable A so as to move the memory position to the next line (S28). Then, after the variable B is set to 1 (S29), a next character code is read in as a character variable X (S21).

On the other hand, if it is judged that the character code read in in S23 above as a character variable X is a return code, it is judged with the variable B whether or not the return code is at the beginning of a line (S24). If the variable B is 1 (if YES in S24), since the return is placed at the beginning of the line and therefore wastes a display line, the return code is not additionally stored in the sentence variable Z. Then, a next character code is read into the character variable X (S21).

On the other hand, if the variable B is not 1 (if NO in S24), the return code is not at the beginning of a line. In this case, it is judged with the variable A whether or not another line can be additionally displayed in the scale-down display area (S31). If the variable A has reached 5 (if YES in S31), the process is finished, since it is impossible to display another line in the scale-down display area.

If the variable A has not reached 5 (if NO in S31), it is possible to display an another line. Therefore, the return code is additionally stored in the sentence variable Z (S32), and 1 is added to the variable A so as to move the memory position to the next line (S33). Then, after the variable B is set to 1 (S34), the next character code is read in as a character variable X (S21).

Note that a character code is stored in the sentence variable Z, the memory position is controlled with the values of the variables A and B. The character code is thereby displayed at a right position in the scale-down display area.

When the process finishing in S27 or S31 leaves a character undisplayed, the following process eliminates the necessity to carry out the process included in S5 at every scroll process. That is, when there is an undisplayed character, it is stored, by standing a flag to the sentence variable Z, that there is an undisplayed character. Subsequently, the process included in S5 is carried out until the end of the text data. An undisplayed character is stored as a sentence variable Z' in the memory. Then, when an instruction is made for a scroll process, the sentence variable Z' is read out of the memory and displayed.

Besides, it is also possible to detect the end of the scaled-down text data by adding a check process in the flow chart shown in FIG. 7, and thus to omit the following process included in the 5. That is, if an end code is stored at the end position of the text data, and a check process is provided between S21 and S23 for detecting the end code, the process of S5 finishes when the end code is detected.

Incidentally, if it is judged that the schedule data indicated by the pointer in the process of S4 shown in FIG. 1 is image data, the second scale-down percentage stored in the second scale-down percentage memory area 102 of the ROM 10 is read out to display the image data (S11). The second scale-down percentage is set in advance so that the image information can be reproduced with high fidelity even when scaled down, and the image data can be accommodated in the scale-down display area with respect to the row directions of a character series layout. In the present embodiment, the second scale-down percentage is set to 50%, and the image data is displayed in the scale-down display area after being scaled down with the second scale-down percentage.

In S6, it is judged whether or not the schedule data (text data) could be all displayed in the scale-down display area in S5. If not all the schedule data was displayed (if NO in S6), the bar button 201b is displayed on the upper right corner of the scale-down display area (S7) as shown in FIG. 6(a), and then S8 is carried out. Besides, in S12, it is judged whether or not the schedule data (image data) could be all displayed in the scale-down display area in S11. If not all the schedule data was displayed (if NO in S12), the bar button 201b is displayed on the upper right corner of the scale-down display area (S13), and then S8 is carried out.

The bar button 201b, as mentioned earlier, indicates that when not all the schedule data indicated by the pointer can be displayed in one scale-down display, the hidden part of the schedule data can be found downward. By pressing the bar button 201b, the scroll process is carried out in only the corresponding scale-down display area, and the hidden schedule data can be thereby displayed in the scale-down display area. On the other hand, if the schedule data is all displayed in the scale-down display area in S6 and S12, S8 is carried out without displaying the bar button 201b.

In S8, it is judged whether or not as many sets of the schedule data as can be displayed in the one-sight display screen (six sets in the present embodiment) have been all displayed. If all the sets have been displayed (if YES in S8), S14 is carried out. On the other hand, if not all the schedule data has been displayed (if NO in S8), it is judged whether the schedule data to be displayed is still being left in the schedule data area 112 (S9). Here, if the schedule data is still left to be displayed (if NO in S9), the pointer is advanced by 1, and then S4 and processes following thereof are carried out to the schedule data indicated by a new pointer. If no schedule data is left to be displayed, that is, if all the schedule data has been displayed, S14 is carried out.

In S14, it is judged whether or not there is an input through the transparent tablet 204 in the one-sight display screen. If there is no input through the transparent tablet 204 (if NO in S14), S14 is carried out again.

On the other hand, if an input through the transparent tablet 204 is detected (if YES in S14), it is judged whether or not the input is either for the downward bar button 201b or for the upward bar button 201c (S15 or S16). If the input is neither for the downward bar button 201b nor for the upward bar button 201c (if NO in S15 and in S16), it is determined that an instruction is made for a different process in the one-sight display screen, and the instructed process is carried out (S18), thus finishing the process with the one-sight display screen. For example, if one of the displayed sets of schedule data is selected, a process of displaying the selected data in a size before being scaled down is carried out.

On the other hand, if the input through the transparent tablet 204 in S14 is either for the downward bar button 201b or for the upward bar button 201c (if Yes either in S15 or in S16), the data is scrolled so that the hidden part thereof is displayed in the scale-down display area. At the same time, the bar button display is switched so as to indicate in which direction a part of the data that has been newly pushed out of the scale-down display area due to the scroll process can be found (S17). If there is hidden data both upward and downward, the bar buttons 201b and 201c are both displayed. As discussed so far, the display control apparatus of the present embodiment, when displaying text data in a scale-down display area, displays the text data with an optimum first scale-down percentage (for example, 66%) for displaying the greatest possible number of recognizable characters. By contrast, the display control apparatus, when displaying image data in a scale-down display area, displays the image data with an optimum second scale-down percentage (for example, 50%) for recognizing the configuration as a whole. This improves visual recognition of both the text data and the image data.

Besides, the display control apparatus of the present embodiment, when displaying text data in a scale-down display area, displays a character series included in the text data, starting from the first character position, according to a character series layout of the scale-down display area where a line end is set so that no line has an undisplayed character that is not accommodated in that line. In other words, the display control apparatus adjusts a character series included in the text data to a character series layout where a line end is set to correspond to the number of characters per line in the scale-down display area, and control the character arrangement of the text data according thereto, so that no line in the scale-down display area has an undisplayed character that is not accommodated in that line.

That is, the display control apparatus displays the text data by dividing the scale-down display area into blocks consisting of five rows and seven columns and dividing the character series in the text data for every 7 characters from the first character position. This enables the text data displayed in the scaled-down manner in the scale-down display area to constitute a continuous character series as a sentence, and also enables the user to confirm the content of the character information without scrolling in a row direction.

Moreover, if there is an undisplayed character or image that can not be accommodated in the scale-down display area, the display control apparatus displays the bar button 201b and/or the bar button 201c in accordance with the respective scale-down display areas. Therefore, the user can easily recognize that there is an undisplayed character or image. Besides, the bar button 201b and/or the bar button 201c exhibit(s) a direction (s) in which the displayed information can be scrolled. The undisplayed character or image can be displayed by touching respective portions of the transparent tablet 204 covering the bar button 201b and the bar button 201c with a pen, and thus scrolling only that scale-down display area. Therefore, the undisplayed character or image can be confirmed in a one-sight display screen without switching from the one-sight display to a non-scale display.

In addition, when scaling down with the above second scale-down percentage (for example, 50%) and displaying image data in a scale-down display area created by dividing a data area into 6 blocks as shown in FIGS. 6(a) through 6(c), the display control apparatus can accommodate the whole image in a row direction of a character series layout in the scale-down display area. Therefore, as in the case of the text data mentioned above, the scroll operation in a row direction is not necessary with respect to image data. Consequently, regardless of the data format, all data content can be confirmed only by scrolling in a column direction in the scale-down display area. As a result, the display control apparatus can prevent the user from becoming confused in an operation and can thus provide excellent operability.

Note that although the text data is written horizontally in the present embodiment, the display control apparatus produces the same effects for text data written vertically. When the text data is written vertically, as already pointed out, the row runs vertically, the column runs horizontally, and the scroll direction is horizontal, not vertical.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A display control apparatus for controlling a display section so that the display section can carry out selective displays of stored sets of text data and stored sets of image data, the selective displays including a non-scaled, independent display of one set of text data, a non-scaled, independent display of one set of image data, and a mixed one-sight display of at least one set of text data and at least one set of image data, the mixed one-sight display being carried out by dividing a screen of the display section into a plurality of scale-down display areas, automatically scaling down text data of the at least one set of text data relative to text data of the non-scaled, independent display of one set of text data and automatically scaling down image data of the at least one set of image data relative to image data of the non-scaled, independent display of one set of image data, and then displaying either the scaled-down text data or the scaled-down image data in each of the areas, the display control apparatus comprising:
text data display control means for displaying the text data in the scale-down display areas;
image data display control means for displaying the image data in the scale-down display areas; and
scale-down percentage control means for setting a scale-down percentage of the text data displayed in the scale-down display areas by the text data display control means to a first scale-down percentage, and setting a scale-down percentage of the image data displayed in the scale-down display areas by the image data display control means to a second scale-down percentage that is different from the first scale-down percentage.

2. The display control apparatus as defined in claim 1, wherein the second scale-down percentage is higher than the first scale-down percentage.

3. The display control apparatus as defined in claim 1, wherein the text data display control means includes a first scale-down percentage memory means for storing the first scale-down percentage, and
the image data display control means includes a second scale-down percentage memory means for storing the second scale-down percentage.

4. The display control apparatus as defined in claim 3, wherein each of the first scale-down percentage memory means and the second scale-down percentage memory means is composed of a Read Only Memory.

5. The display control apparatus as defined in claim 1, wherein each of the text data display control means and the image data display control means is composed of a microprocessor.

6. A display control apparatus for controlling a display section so that the display section can carry out a mixed one-sight display of text data and image data by dividing a screen of the display section into a plurality of scale-down display areas, scaling down the text data and the image data, and then displaying either the scaled-down text data or the scaled-down image data in each of the areas, the display control apparatus comprising:
text data display control means for displaying the text data in the scale-down display areas;
image data display control means for displaying the image data in the scale-down display areas; and
scale-down percentage control means for setting a scale-down percentage of the text data displayed in the scale-down display areas by the text data display control means to a first scale-down percentage, and setting a scale-down percentage of the image data displayed in the scale-down display areas by the image data display control means to a second scale-down percentage that is different from the first scale-down percentage,
wherein the text data display control means includes character arrangement control means for adjusting a character series included in the text data to a character series layout in which a line end is set so as to correspond to a number of characters allowed to be displayed per line in the scale-down display area.

7. The display control apparatus as defined in claim 6,
wherein the character arrangement control means is composed of a microprocessor.

8. A display control apparatus for controlling a display section so that the display section can carry out a mixed one-sight display of text data and image data by dividing a screen of the display section into a plurality of scale-down display areas, scaling down the text data and the image data, and then displaying either the scaled-down text data or the scaled-down image data in each of the areas, the display control apparatus comprising:
text data display control means for displaying the text data in the scale-down display areas;
image data display control means for displaying the image data in the scale-down display areas;
scale-down percentage control means for setting a scale-down percentage of the text data displayed in the scale-down display areas by the text data display control means to a first scale-down percentage, and setting a scale-down percentage of the image data displayed in the scale-down display areas by the image data display control means to a second scale-down percentage that is different from the first scale-down percentage;
undisplayed data detecting means for, when there is undisplayed character data and/or undisplayed image data not able to be displayed in the scale-down display areas, detecting the existence of the undisplayed data; and
undisplayed data informing means for, when the undisplayed data detecting means has detected the existence of the undisplayed data, displaying the existence of the undisplayed data on the display section for each of the scale-down display areas having the undisplayed data.

9. The display control apparatus as defined in claim 8,
wherein the undisplayed data detecting means can detect a direction in which the undisplayed data is hidden for each of the scale-down display areas, and
the undisplayed data informing means can display on the display section for each of the scale-down areas the direction in which the undisplayed data is hidden.

10. The display control apparatus as defined in claim 9, further comprising:
scroll direction display means for, when there is undisplayed data not able to be displayed in the scale-down display areas, displaying on the display section a scroll direction of the displayed information for each of the scale-down display areas having the undisplayed data; and
scroll control means that enables a signal to be inputted from scroll direction input means realizing a scroll instruction operation in accordance with a display state of the scroll direction,
wherein the scroll control means carries out a scroll control of one of the scale-down display areas that is to be operated according to the input of the signal from the scroll direction input means separately from the other scale-down display areas.

11. The display control apparatus as defined in claim 10,
wherein the scroll direction display means displays only a direction in which the displayed information can be scrolled.

12. The display control apparatus as defined in claim 10,
wherein the text data display control means includes character arrangement control means for adjusting a character series included in the text data to a character series layout in which a line end is set so as to correspond to a number of characters allowed to be displayed per line in the scale-down display area, and
the scale-down percentage control means for setting the second scale-down percentage to a scale-down percentage according to which the displayed image data can be all accommodated into the scale-down display area with respect to row directions of the character series layout.

13. An apparatus comprising:
a display section; and
a display control device for controlling the display section so that the display section can carry out selective displays of stored sets of text data and stored sets of image data, the selective displays including a non-scaled, independent display of one set of text data, a non-scaled, independent display of one set of image data, and a mixed one-sight display of at least one set of text data and at least one set of image data, the mixed one-sight display being carried out by dividing a screen of the display section into a plurality of scale-down display areas, automatically scaling down text data of the at least one set of text data relative to text data of the non-scaled, independent display of one set of text data and automatically scaling down image data of the at least one set of image data relative to image data of the non-scaled, independent display of one set of image data, and then displaying either the scaled-down text data or the scaled-down image data in each of the areas, the display control device including:
text data display control means for displaying the text data in the scale-down display areas;
image data display control means for displaying the image data in the scale-down display areas; and
scale-down percentage control means for setting a scale-down percentage of the text data displayed in the scale-down display areas by the text data display control means to a first scale-down percentage, and setting a scale-down percentage of the image data displayed in the scale-down display areas by the image data display control means to a second scale-down percentage that is different from the first scale-down percentage.

14. A display control method of controlling a display section so that the display section can carry out displays of stored sets of text data and stored sets of image data, the displays including a non-scaled, independent display of one set of text data, a non-scaled, independent display of one set of image data, and a mixed one-sight display of at least one set of text data and at least one set of image data, the mixed one-sight display being carried out by dividing a screen of the display section into a plurality of scale-down display areas, automatically scaling down text data of the at least one set of text data relative to text data of the non-scaled, independent display of one set of text data and automatically scaling down image data of the at least one set of image data relative to image data of the non-scaled, independent display of one set of image data, and then displaying either the scaled-down text data or the scaled-down image data in each of the areas, comprising the steps of:
(a) setting a scale-down percentage of the text data displayed in the scale-down display areas to a first scale-down percentage, and setting a scale-down percentage of the image data displayed in the scale-down display areas to a second scale-down percentage that is different from the first scale-down percentage;

(b) displaying the text data in the scale-down display areas with the first scale-down percentage; and (c) displaying the image data in the scale-down display areas with the second scale-down percentage.

15. The display control method as defined in claim 14, wherein the second scale-down percentage is higher than the first scale-down percentage.

16. The display control method as defined in claim 14, further comprising the step of judging whether or not there is undisplayed character data and/or undisplayed image data not able to be displayed in the scale-down display areas, and, if the undisplayed data exists, displaying the existence of the undisplayed data on the display section for each of the scale-down display areas having the undisplayed data.

17. The display control method as defined in claim 14, further comprising the steps of:

judging whether or not there is undisplayed character data and/or undisplayed image data not being able to be adjusted in the scale-down display areas, and, if the undisplayed data exists, displaying the existence of the undisplayed data on the display section for each of the scale-down display areas having the undisplayed data; and carrying out a scroll control of one of the scale-down display areas that is to be operated according to a scroll instruction operation corresponding to a display state of a scroll direction separately from the other scale-down display areas.

18. The display control method as defined in claim 17, wherein, in the step (a), the second scale-down percentage is set to a scale-down display percentage according to which the displayed image data can be all accommodated into the scale-down display area with respect to row directions of a character series layout, and the step (b) includes the step of adjusting a character series included in the text data to a character series layout in which a line end is set so as to correspond to a number of characters allowed to be displayed per line in the scale-down display area.

19. A display control method of controlling a display section so that the display section can carry out a mixed one-sight display of text data and image data by dividing a screen of the display section into a plurality of scale-down display areas, scaling down the text data and the image data, and then displaying either the scaled-down text data or the scaled-down image data in each of the areas, comprising the steps of:

(a) setting a scale-down percentage of the text data displayed in the scale-down display areas to a first scale-down percentage, and setting a scale-down percentage of the image data displayed in the scale-down display areas to a second scale-down percentage that is different from the first scale-down percentage, (b) displaying the text data in the scale-down display areas with the first scale-down percentage; and (c) displaying the image data in the scale-down display areas with the second scale-down percentage, wherein the step (b) includes the step of adjusting a character series included in the text data to a character series layout in which a line end is set so as to correspond to a number of characters allowed to be displayed per line in the scale-down display area.

20. A display control apparatus for controlling a display section so that the display section can carry out selective displays of stored sets of text data and image data, the selective displays including a non-scaled, independent display of one set of text data, a non-scaled, independent display of one set of image data, and a mixed one-sight display of at least one set of text data and at least one set of image data, the mixed one-sight display being carried out by dividing a screen of the display section into a plurality of scale-down display areas, automatically scaling down text data of the at least one set of text data relative to text data of the non-scaled, independent display of one set of text data and automatically scaling down image data of the at least one set of image data relative to image data of the non-scaled, independent display of one set of image data, and then displaying either the scaled-down text data or the scaled-down image data in each of the areas, the display control apparatus comprising:

text data display control means for displaying the text data in the scale-down display areas;

image data display control means for displaying the image data in the scale-down display areas;

a memory for storing a first scale-down percentage and a second scale-down percentage that is different from the first scale-down percentage; and scale-down percentage control means for setting a scale-down percentage of the text data displayed in the scale-down display areas by the text data display control means to the first scale-down percentage, and setting a scale-down percentage of the image data displayed in the scale-down display areas by the image data display control means to the second scale-down percentage.

21. A display control method, comprising:

independently displaying on a display screen, in response to a first user input, one of a plurality of sets of text data;

independently displaying on said display screen, in response to a second user input, one of a plurality of sets of image data; and displaying on said display screen, in response to a third user input, a mixed one-sight display comprising at least one set of text data and at least one set of image data, the displaying being carried out by dividing the display screen into a plurality of display areas and then displaying each respective set of text data and each respective set of image data in a corresponding one of the plurality of display areas, wherein, based on a first pre-stored scale-down percentage, each set of text data displayed in the display areas of the mixed one-sight display is automatically scaled-down relative to the independent display of text data, wherein, based on a second pre-stored scale-down percentage, each set of image data displayed in the display areas of the mixed one-sight display is automatically scaled-down relative to the independent display of image data, and wherein the first pre-stored scale-down percentage is different than the second pre-stored scale-down percentage.

22. The method according to claim 21, wherein said display screen is a liquid crystal display screen.

23. The method according to claim 21, wherein said display screen is a touch-sensitive display screen.

24. The method according to claim 21, wherein the first, second and third user inputs comprise selections of keys displayed on said display screen.

25. The method according to claim 21, wherein the first pre-stored scale-down percentage is higher than the second pre-stored scale-down percentage.

* * * * *